(No Model.)

M. KAMAK.
COMBINED KNIFE AND SCISSORS.

No. 310,439. Patented Jan. 6, 1885.

WITNESSES:

INVENTOR
Max Kamak
BY
ATTORNEYS

UNITED STATES PATENT OFFICE.

MAX KAMAK, OF NEW YORK, N. Y.

COMBINED KNIFE AND SCISSORS.

SPECIFICATION forming part of Letters Patent No. 310,439, dated January 6, 1885.

Application filed October 2, 1884. (No model.)

*To all whom it may concern:*

Be it known that I, MAX KAMAK, a citizen of the United States, residing at New York, in the county and State of New York, have invented new and useful Improvements in Combined Knife and Scissors, of which the following is a specification.

This invention relates to improvements in combined knives and scissors; and it consists in the combination, with a handle, a spring contained therein, and a scissor-blade pivoted to the handle and exposed to the action of the spring, of a scissor-blade provided with a bow and connected to the other scissor-blade by a pivot, on which it can be swung around to close the scissors into the handle.

Figure 1:
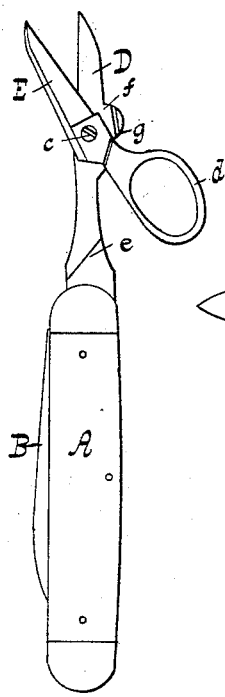
Figure 2:
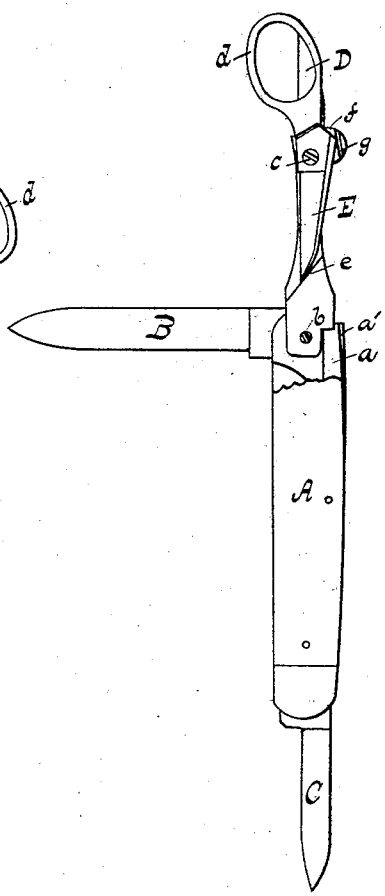
Figure 3:
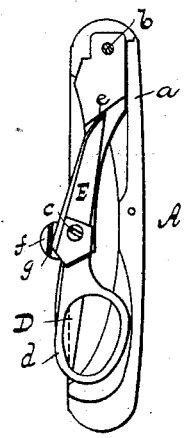

In the accompanying drawings, Figure 1 is a side view showing the scissors open ready for use. Fig. 2 is a side view, part in section, with the scissor-blade swung around. Fig. 3 is a longitudinal section showing the scissors closed into the handle.

Similar letters indicate corresponding parts.

In the drawings, the letter A designates the handle, provided with the springs $a\ a'$, Fig. 2, and knife-blades B C, exposed to the action of the spring $a'$.

D is one of the scissor-blades, pivoted to the handle by the pivot $b$, and exposed to the action of the spring $a$.

E is another scissor-blade, connected to the scissor-blade D by means of a pivot or screw, $c$, and provided with a bow, $d$, into which the finger is inserted when the scissors are used.

$e$ is a projection on the scissor-blade D, against which the point of the scissor-blade E bears when the latter is swung around in the position shown in Figs. 2 and 3.

$f$ is a projection on the scissor-blade D, containing a groove, $g$, affording means for drawing the scissor-blades out from the handle.

As shown in Fig. 3, the scissors are closed into the handle. When it is desired to use them, the finger-nail is inserted in the groove $g$, and the scissors are then drawn to the position shown in Fig. 2, and then the blade E turned to the position shown in Fig. 1. To close the scissors into the handle the scissor-blade E is turned in the position shown in Fig. 2, when they can be closed into the handle by simply snapping them down, as in the case of an ordinary knife-blade.

Previous to my invention scissors have been combined with knife-handles, the blades having a spring inserted between them, in which case the operator has no direct control over the blades, besides being very inconvenient to use. This is overcome in my invention by providing the scissor-blade E with the bow $d$ and omitting the spring, by which means the scissors are made as convenient to use as an ordinary isolated small pair of scissors.

What I claim as new, and desire to secure by Letters Patent, is—

The combination, substantially as hereinbefore described, with the handle A, the spring $a$, and the scissor-blade D, pivoted to the handle and exposed to the action of the spring, of the scissor-blade E, provided with the bow $d$, and connected to the scissor-blade D by a pivot, on which it can be swung around to close the scissors into the handle.

In testimony whereof I have hereunto set my hand and seal in the presence of two subscribing witnesses.

MAX KAMAK. [L. S.]

Witnesses:
W. HAUFF,
E. F. KASTENHUBER.